US007447382B2

(12) United States Patent
Nestares et al.

(10) Patent No.: US 7,447,382 B2
(45) Date of Patent: Nov. 4, 2008

(54) COMPUTING A HIGHER RESOLUTION IMAGE FROM MULTIPLE LOWER RESOLUTION IMAGES USING MODEL-BASED, ROBUST BAYESIAN ESTIMATION

(75) Inventors: Oscar Nestares, Sunnyvale, CA (US); Horst W. Haussecker, Palo Alto, CA (US); Scott M. Ettinger, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 787 days.

(21) Appl. No.: 10/882,723

(22) Filed: Jun. 30, 2004

(65) Prior Publication Data

US 2006/0002635 A1  Jan. 5, 2006

(51) Int. Cl.
   *G06K 9/32* (2006.01)
(52) U.S. Cl. .................. 382/299; 382/260; 382/275; 358/1.2; 358/3.26; 358/3.27
(58) Field of Classification Search ............. 382/260, 382/275, 299; 358/1.2, 3.26, 3.27, 463
   See application file for complete search history.

(56) References Cited

U.S. PATENT DOCUMENTS

| 5,781,666 | A |   | 7/1998 | Ishizawa et al. |
| 5,875,268 | A |   | 2/1999 | Miyake |
| 6,038,257 | A |   | 3/2000 | Brusewitz et al. |
| 6,044,375 | A | * | 3/2000 | Shmueli et al. ............. 707/101 |
| 6,198,467 | B1 |   | 3/2001 | Chiang |
| 6,442,555 | B1 | * | 8/2002 | Shmueli et al. ............. 707/101 |
| 7,006,576 | B1 | * | 2/2006 | Hannuksela ........... 375/240.27 |
| 7,151,801 | B2 | * | 12/2006 | Grossberg et al. ...... 375/240.27 |

| 2004/0213443 | A1 | 10/2004 | Haussecker et al. |
| 2006/0104540 | A1 | 5/2006 | Haussecker et al. |
| 2007/0019887 | A1 | 1/2007 | Nestares et al. |

FOREIGN PATENT DOCUMENTS

| TW | 490978 | 6/2002 |
| WO | WO-0147283 A1 | 6/2001 |

OTHER PUBLICATIONS

Michael J. Black, et al., "Robust Anisotropic Diffusion", IEEE Transactions on Image Processing, vol. 7, No. 3, Mar. 1998, 1057-7149/98 (pp. 421-432).

Assaf Zomet, et al., Robust Super-Resolution*, School of Computer Science and Engineering, The Hebrew University of Jerusalem, 91904, Jerusalem, Israel, ISBN 0-7695-1272-0/01 (C) 2001 IEEE (pp. 1-6).

(Continued)

*Primary Examiner*—Yosef Kassa
(74) *Attorney, Agent, or Firm*—Blakely, Sokoloff, Taylor & Zafman LLP

(57) ABSTRACT

A result higher resolution (HR) image of a scene given multiple, observed lower resolution (LR) images of the scene is computed using a Bayesian estimation image reconstruction methodology. The methodology yields the result HR image based on a Likelihood probability function that implements a model for the formation of LR images in the presence of noise. This noise is modeled by a probabilistic, non-Gaussian, robust function. Other embodiments are also described and claimed.

21 Claims, 9 Drawing Sheets

OTHER PUBLICATIONS

David Capel, et al., "Computer Vision Applied to Super Resolution", Super-Resolution Image Reconstruction, Digital Vision, Ltd., May 2003, IEEE Signal Processing Magazine, 1053-5888/03, (pp. 75-86).

Sung Cheol Park, et al., "Super-Resolution Image Reconstruction: A Technical Overview", Super-Resolution Image Reconstruction, Digital Vision, Ltd., May 2003, IEEE Signal Processing Magazine, 1053-5888/03 (pp. 21-36).

Sina Farsiu, et al., "Fast and Robust Super-Resolution", Electrical Engineering Department, University of California Santa Cruz, Computer Science Department, SCCM Program, Stanford University, 0-7803-7750-8/03—2003 IEEE (pp. II-291-II-294).

Hanno Scharr, et al., "Image Statistics and Anisotropic Diffusion", Intel Research, Santa Clara, California, USA, Department of Computer Science, Brown University, RI, USA, ICG III, Research Center Julich, Julich, Germany, IEEE Computer Society, Proceedings of the Ninth IEEE International Conference on Computer Vision (ICCV'03), 0-7695-1950-4/03—2003 IEEE (pp. 1-8).

Peter Chesseman, et al., "Super-Resolved Surface Reconstruction From Multiple Images", Technical Report FIA-94-12, Artificial Intelligence Research Branch, NASA Ames Research Center, Moffett Field, CA, USA, Dec. 14, 1994, Research Institute for Advanced Computer Sciences (pp. 1-14).

PCT International Search Report (dated Oct. 28, 2005), International Application No. PCT/US2005/021961—International Filing Date Jun. 20, 2005 (12 pages).

Hu He, et al, "MAP Based Resolution Enhancement of Video Sequences Using a Huber-Markov Random Field Image Prior Model", Proceedings 2003 International Conference on Image Processing, Barcelona, Spain, Sep. 14-17, 2003, International Conference on Image Processing, New York, NY, IEEE USA vol. 2 of 3, Sep. 14, 2003, XP010669881, ISBN: 0-7803-7750-8 (pp. 933-936).

A. Ben Hamza, et al., "Image Denoising: A Nonlinear Robust Statistical Approach", IEEE Transactions on Signal Processing IEEE USA, vol. 49, No. 12, Dec. 2001, XP011059492, ISN: 1053-587X (pp. 3045-3054).

PhotoAcute, Take better photos, reduce noise, increase quality and resolution of digital ph . . . , p. 1 of 1, Developed by Almalence: Design by A. Green, printed on Nov. 28, 2005, www.photoacute.com/index.html.

* cited by examiner

COMPUTING A HIGHER RESOLUTION IMAGE FROM MULTIPLE LOWER RESOLUTION IMAGES USING MODEL-BASED, ROBUST BAYESIAN ESTIMATION

BACKGROUND

An embodiment of the invention is directed to signal processing techniques to obtain a higher resolution, HR, image (or sequence of images) from multiple observed lower resolution images. Other embodiments are also described.

In most electronic imaging applications, images with higher resolution are generally more desirable. These are images that have greater pixel density and hence show greater detail than lower resolution images of the same scene. HR images have many applications, including medical imaging, satellite imaging, and computer vision.

An HR image may be obtained by simply increasing the number and/or density of pixel sensor elements in the electronic image sensor chip that is used to capture the image. This, however, may increase the size of the chip so much that capacitance effects will hamper the rapid transfer of pixel signal values, thereby causing difficulty for obtaining high-speed captures and video. Another possibility is to reduce the physical size of each pixel sensor element; however, doing so may increase the noise level in the resulting pixel signal value. Additionally, increasing the number of pixel sensor elements increases the cost of the device, which in many situations is undesirable (e.g., cameras mounted on mobile devices whose primary function is not image acquisition, like personal digital assistants (PDA) and cellular phones), and in others is prohibitive (e.g., infrared sensors). Therefore, another approach to obtaining HR images (that need not modify the lower resolution sensor) is to perform digital signal processing upon multiple lower resolution (LR) images captured by the sensor, to enhance resolution (also referred to as super resolution, SR, image reconstruction).

With SR image reconstruction, multiple observed LR images or frames of a scene have been obtained that in effect are different "looks" of the same scene. These may be obtained using the same camera, for example, while introducing small, so-called sub-pixel shifts in the camera location from frame to frame, or capturing a small amount of motion in the scene. Alternatively, the LR images may be captured using different cameras aimed at the same scene. A "result" HR image is then reconstructed by aligning and combining properly the LR images, so that additional information, e.g. an increase in resolution or de-aliasing, is obtained for the result HR image. The process may also include image restoration, where de-blurring and de-noising operations are performed as well, to yield an even higher quality result HR image.

The reconstruction of the result HR image, however, is a difficult problem because it belongs to the class of inverse, ill-posed mathematical problems. The needed signal processing may be interpreted as being the reverse of a so-called observation model, which is a mathematically deterministic way to describe the formation of LR images of a scene (based upon known camera parameters). Since the scene is approximated by an acceptable quality HR image of it, the observation model is usually defined as relating an HR discrete image of the scene (with a given resolution and pixel grid) to its corresponding LR images. This relationship (which may apply to the formation of both still images and video) may be given as the concatenation of a geometric transform, a blur operator, and a down-sampling operator, plus an additive noise term. Examples of the geometric transform include, global or local translation and rotation, while the blur operator attempts to duplicate camera non-idealities, such as out of focus, diffraction limits, aberration, slow motion blur, and image sensor integration on a spatial region (sometimes combined all together in a point spread function). The down-sampling operator down samples the HR image into aliased, lower resolution images. This observation model may be expressed by the mathematical relationship $$Y=W*f+n, \quad (1)$$

where Y is the set of observed LR images and W represents the linear transformation of HR pixels in an HR image f to the LR pixels in Y (including the effect of down-sampling, geometric transform and blur). The n represents additive noise having random characteristics, which may represent, for example, the variation (or error) between LR images that have been captured by the same camera without any changes in the scene and without any changes to camera or lighting settings. Based on the observation model in Equation (1), SR image reconstruction estimates the HR image f that corresponds to a given set of LR images Y.

A Bayesian estimation process (also referred to as stochastic or probabilistic SR image reconstruction) may be used to estimate f, to get the "result" HR image mentioned above. In that case, an "a posteriori" probability function (typically, a probability density function) is mathematically defined as p(f|Y), which is the probability of a particular HR image f given the set of observed LR images Y. Applying a mathematical manipulation, known as Bayes Law, the optimization problem, which is finding a suitable HR image f, e.g. one that has the highest probability given a set of LR images or that maximizes p(f|Y), may be re-written as $$P(f|Y)=p(Y|f)*p(f), \quad (2)$$

where p(f) is called the "Prior" probability density function that gives the probabilities of a particular HR image prior to any observation. The Prior indicates what HR images are more probable to occur based on, for example, a statistical characterization of an ensemble of different HR images. The Prior probability may be a joint probability, defined over all of the pixels in an HR image, and should be based on statistical data from a large number of images. However, estimating and describing the Prior probability as a joint distribution over all pixels may not be computationally feasible. Accordingly existing methods use approximate models, based on the fact that in many types of images, correlations among pixels decay relatively quickly with pixel distance. For example, the Prior may be based on a probabilistic construct called Markov Random Fields (MRFs). Rather than take the position that all HR images are equally likely, the MRF is tailored to indicate for example that certain pixel patterns (e.g., piece-wise continuous; text images) are more likely than others. An image may be assumed to be globally smooth in a mathematical sense, so the MRF typically used to define the Prior has a normal (Gaussian) probability distribution.

As to p(Y|f), that is called the "Likelihood" function; it is a probability density function that defines the probabilities of observing LR images that would correspond to a particular HR image. The Likelihood may be determined based on the observation model described above by the mathematical relationship in Equation (1), where the noise term is typically assumed to have a Gaussian probability distribution. The estimation process becomes one of iteratively determining trial HR images and stopping when there is convergence, which may signify that a maximum of the a posteriori probability function has been reached.

BRIEF DESCRIPTION OF THE DRAWINGS

The embodiments of the invention are illustrated by way of example and not by way of limitation in the figures of the accompanying drawings in which like references indicate similar elements. It should be noted that references to "an" embodiment of the invention in this disclosure are not necessarily to the same embodiment, and they mean at least one.

DETAILED DESCRIPTION

Figure 1:
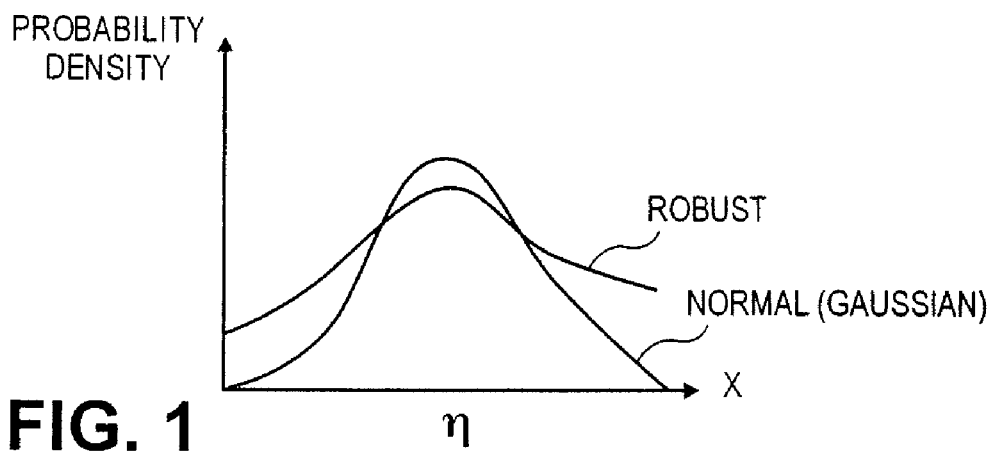
FIG. 1 is a graph of robust and normal probability densities.

An embodiment of the invention is a method for image processing in which a Bayesian estimation image reconstruction methodology computes a result HR image of a scene given multiple observed LR images. The result HR image is based on a Likelihood probability function that implements an observation model for the formation of LR images in the presence of noise. The methodology models the noise by a probabilistic, non-Gaussian, robust function. Such robust functions are defined in the statistical estimation literature and are characterized by long tails in the probability density function, as shown in FIG. 1. In contrast to the normal or Gaussian distribution, the robust distribution acknowledges the occurrence of a few points that are affected by an unusually high amount of noise, also referred to as outliers (which are at the tail ends of the density graphs shown in FIG. 1). This change to the modeling of noise better models the formation of LR images from the HR image, so that the method produces a more accurate solution. Thus, although implementing the SR process is made easier when the noise is modeled by a Gaussian probability function, such an assumption does not adequately handle images that contain different levels of outliers, which are common in SR reconstruction, due especially to inaccuracies in the image alignment.

Figure 2:
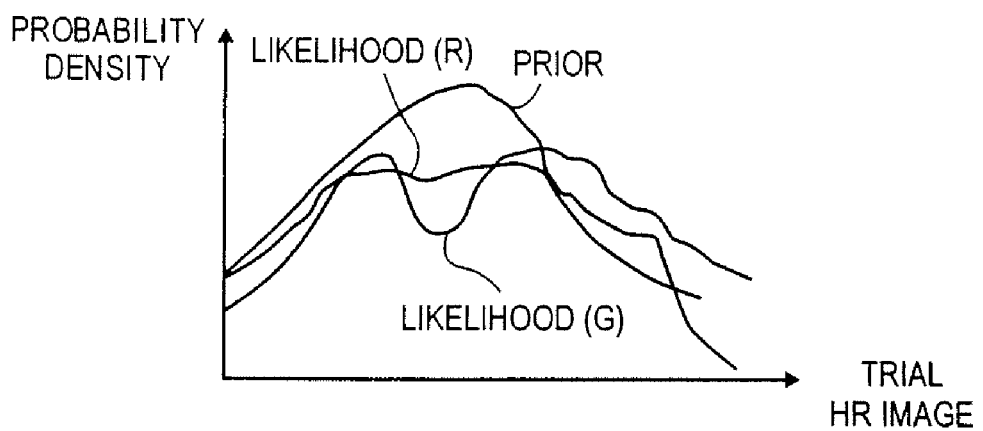
FIG. 2 is a graph of Likelihood and Prior probability functions for a trial HR image.

Referring now to FIG. 2, a graph of probability density for a trial HR image is shown in which the example Likelihood and Prior function have been drawn. The maximum a posteriori (MAP) is proportional to the Prior and the Likelihood as given by Equation (2) above. In this case Likelihoods for two different assumed noise distributions (R) and (G) are shown, corresponding respectively to a robust probability function to model the noise (R), and another using a normal or Gaussian (G). The graph illustrates the effect of an outlier in a given LR image (not shown) that translates into a dip in the Likelihood (G) for certain areas of a trial HR image. This strong dip in the Likelihood (G) is due to the outlier dominating the Likelihood function, indicating a relatively low probability for the set of observed LR images, given this particular trial HR image. However, in actuality, it may be that the trial HR image is a good one, and that the only reason why the Likelihood value is low is due to the outlier (in one or more of the observed LR images). This domination of the Likelihood function by an outlier is negated by the use of a robust function which downplays the role of outlier pixels in observed LR images. Accordingly, the computed robust Likelihood (R) for this particular set of observed LR images (given that trial HR image) is higher than if the noise was modeled by a Gaussian function.

Figure 3:
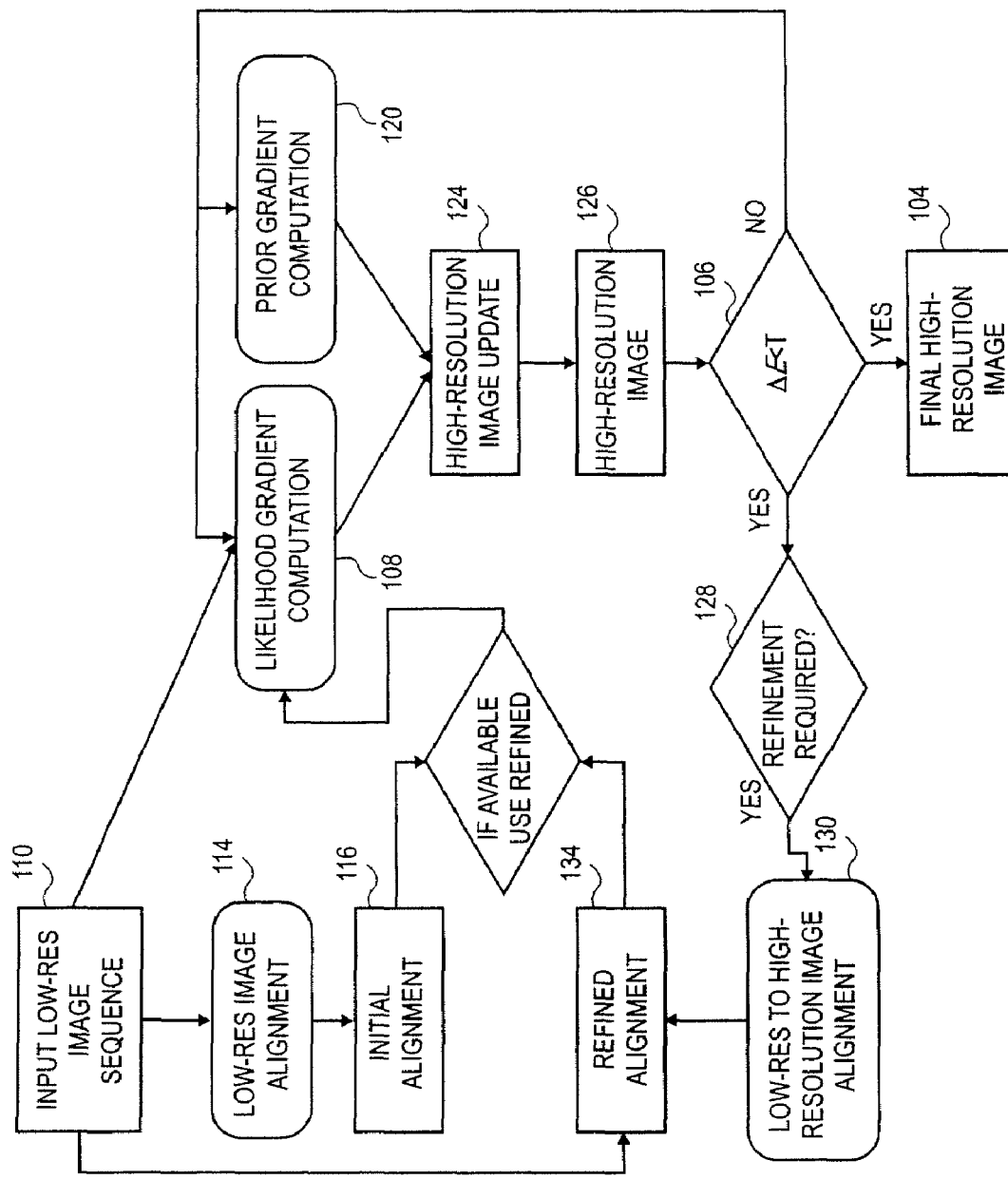
FIG. 3 is a flow diagram of some of the operations in a super resolution image reconstruction process.

The various embodiments of the invention described here may prove the robustness of the SR process such that it can be used in different types of real world applications to be described below. FIG. 3 illustrates a flow diagram of some of the operations in a SR method. The method contains a main loop that is repeatedly performed as part of an iterative process to determine the result (or final) HR image 104. This process may attempt to find an optimum value, here a minimum, for an error function E. More specifically, this error function may be defined as the negative logarithm of the posterior probability in Equation (2). This error function may be minimized using any standard minimization techniques. For example, FIG. 3 shows the use of the conjugate gradient method which is an iterative method that provides an acceptable balance between complexity and speed of convergence. The criteria for convergence is $\Delta E<T$, which tests whether the error or difference in the posterior probability of Equation (2), between two successive trial HR images, is less than a predefined threshold, T (block 106). An alternative test is to define $\Delta E$ as a difference between consecutive trial HR images.

The conjugate gradient method computes the gradient of the error function which has two terms in this embodiment, one corresponding to the Likelihood and the other to the Prior. The computation of the Likelihood gradient (block 108) involves the application of standard image processing operations including geometric warping, linear filtering, and sub-sampling/upsampling, for example, that model both the forward and the reverse of the LR image formation process. To compute the Likelihood gradient, an initial, trial HR image is needed. This may be, for example, a combination of one or more of an input (observed) LR image sequence (block 110) that have been aligned (block 114) to yield an HR image with an initial alignment (block 116). The results of this initial alignment are then used to compute the Likelihood gradient (block 108). Recall once again that the SR method assumes that the input LR images are the result of resampling an HR image, and the goal is to find the HR image which, when resampled in the grid of the input LR images according to the imaging observation model, predicts well the input (observed) LR images.

The other half of the main computation loop in FIG. 3 is concerned with the Prior gradient (block 120). Different types of probability functions may be used for the Prior, but in the case of a robust MRF, the Prior gradient is equivalent to one update of a corresponding robust anisotropic diffusion filter, as described in Michael J. Black, et al., "Robust Anisotropic Diffusion", Institute of Electrical and Electronics Engineers, IEEE Transactions on Image Processing, Vol. 7, No. 3, March 1998. Other implementations of the Prior function and its corresponding gradient may alternatively be used.

The gradients computed in blocks 108 and 120 indicate to the iterative process the direction in which to move so as to come closer to a peak or trough in the combination of the Likelihood and Prior functions (see FIG. 2). This movement along the plots of the Likelihood and Prior functions results in a change or update (block 124) to the next HR image, which generates the current, trial HR image 126. This current trial HR image 126 is then inserted into Equation (2) and a $\Delta E$, which is the difference between the current value of Equation (2) and a previous value of Equation (2) is compared to a threshold T (block 106). If the ΔE is still too high, then the gradient computation loop is repeated. An additional decision may be made as to whether or not a refinement of the LR image initial alignment (block 116) is needed, in block 128. This alignment may be evaluated using any one of conventional techniques. Operation may then proceed with an alignment of the LR images to a new HR image (block 130) resulting in a refined alignment (block 134). The next gradient computation for the Likelihood may use an HR image that has this refined alignment 134.

Note that if a normal or Gaussian function is assigned to model the additive noise for computing the Likelihood (and its gradient), then the HR image update (block 124) may cause the next trial HR image 126 to be changed too much, due to an outlier in the input LR image sequence 110, thereby causing the methodology to select a less optimal final HR image 104.

A methodology for using the robust functions to model the noise in the observation model, which functions are able to "down weight" or in some cases essentially ignore outliers in the SR process, may be as follows. Ideally, the probability distribution of the noise should be learned given a set of training examples consisting of HR images and their corresponding LR images. This set can be difficult to obtain, and even if it is available, it might not contain the noise attributed to errors in the alignment. For this reason, in most cases it may be better to use a generic robust function from the statistics literature. The choice of the robust function to use might depend on the knowledge available about the current images. For example, the process may use one of two different robust functions depending on the available knowledge about the presence of outliers. If it is expected that the observed LR images will have relatively few outliers, then the robust function used to model the additive noise may be the well known Huber function. Note that such outliers may be caused by alignment errors, inaccurate modeling of blur, random noise, moving objects, motion blur, as well as other sources. Thus, if a process is expected to have, for example, relatively accurate image alignment, the Huber function may be used to model the additive noise. The Huber function, although not being extremely robust, has the advantage of being convex, thus essentially guaranteeing a unique optimum (maximum or minimum) in the Likelihood function.

On the other hand, if it is expected that the observed LR images will have relatively many outliers (e.g., salt and pepper noise, and/or regions in the aligned image that have inaccurate alignment), the robust function may be set to a Tukey function which is considered very robust, thereby essentially eliminating any effect of the outliers in the solution.

In addition to the option of setting the robust function to be a different one depending on whether relatively few or many outliers are expected, a shape of the robust function may be estimated and altered according to the availability of training data. For example, the shape of the robust function may be adjusted by a scale factor, where if there is sufficient training data in the form of one or more ground truth HR images and their corresponding LR images, the scale factor is estimated from samples obtained in computing an error between the observed LR images of the scene and their projections from the ground truth HR images.

On the other hand, if there is no such training data, the scale factor may be estimated by taking a current, trial HR image 126 (FIG. 3) as a ground truth HR image, and applying a robust estimator as the scale factor. This robust estimator may be, for example, the median of residuals with respect to the median value. Other types of robust estimators may alternatively be used here.

According to another embodiment of the invention, the Prior function may be as follows. If there is specific or statistical information concerning the expected HR images, such as computer aided design (CAD) models for structures captured in the observed LR images, then procedures similar to those described in U.S. patent application Ser. No. 10/685,867 entitled "Model Based De-Noising of Images and Image Sequences", assigned to the same Assignee as that of this patent application, may be used. Those procedures may be particularly beneficial in applications such as microscopic imaging of silicon structures using scanning methods (e.g., focused ion beam; scanning electron microscope). That is because the structures being imaged in that case have corresponding, underlying CAD models.

On the other hand, if no such model-based knowledge of the expected HR images exists, then a generic Prior function in the form of, for example, a robust MRF may be used. The portion of the gradient that corresponds to such a Prior is equivalent to one update of an anisotropic diffusion methodology. For this reason, any one of several different anisotropic diffusion methods that best adapts to the type of images that are to be expected may be used. For generic images, however, a good option for preserving edges in detail in the image is the Tukey function on a 4-neighbor MRF, as described by Black, et al., the article identified above. Other options include neighbor schemes (e.g., 8-neighbor) with cost functions that are adapted to the type of filter being used, that can be generic or learned from a training set of images. See also H. Scharr, et al. "Image Statistics and Anisotropic Diffusion", IEEE Conference on Computer Vision and Pattern Recognition, Pages 840-847, Oct. 13-16, 2003. Use of either of the above options in the SR methods described here is expected to provide improved performance relative to the use of a Gaussian MRF as the generic Prior.

Image Alignment

In the previous discussion, it may be assumed that the geometric transformations that align the sampling grids of the observed or input LR image sequence 110 with the sampling grid of the HR image 126 were known. However, in most cases, this information is not known a priori, unless the LR image sequence has been obtained under explicit controlled motion of the image acquisition device relative to the objects in the scene. Therefore, an estimate of these geometrical transforms are often needed. According to another embodiment of the invention, these geometrical transforms may be estimated as follows.

First, an initial estimate of the geometric transforms between the observed or input LR images is obtained. Different options may be used here, depending on the characteristics of the motion of the image acquisition device relative to the scene being imaged. For generic sequences, with small changes in perspective, a global affine transformation model is used. For images with large changes in perspective, the affine model may be no longer appropriate so that higher order models (e.g., projective) should be used. Finally, if there is relative motion between the objects in the scene or perspective changes together with discontinuities in depth, global models may generally not be appropriate, such that either a dense local motion model (optical flow) or a layered model should be used.

Once a reasonable estimate of the HR image has been obtained (for example after 4-6 iterations), the initial alignment 116 (FIG. 3) may be refined (block 134) using the current version of the trial HR image 126. The latter is expected to provide more accurate results than the LR to LR image alignment 114, because the LR images are affected by aliasing. This technique may be compared to a combined Bayesian estimation for both the HR image and the geometrical transform.

Regardless of the motion model used for the alignment, as well as the type of alignment (that is LR to LR, or HR to HR), state of the art gradient based, multi-resolution, robust image motion estimation methods should be used to determine the alignment that will be input into the Likelihood gradient computation block 108 (FIG. 3).

Color Images

The embodiments of the invention described above may be assumed to operate with gray-level images. These SR methods, however, may also be applied to color images, which are usually presented as three components for each pixel, corresponding to Red (R), Green (G) and Blue (B) colors bands. The method can be applied to each color band independently to obtain a final HR image in RGB. However, applying the method to the three RGB bands is very computationally demanding. For this reason an alternative method is described in the flow diagram shown in FIG. 4, which is less computationally intensive, and produces results that are perceptually equivalent to applying the method to all three color bands. In this embodiment, operation begins with converting the input LR color image sequence 404 from the RGB color space into a color space that is consistent with the human perception of color, in this case CIELab (Commite Internationale de l'Eclairage) (block 408). In the CIELab color space, the three components are luminance (L) and two opponent color components (a, b). The SR methodology described above is applied only to the L component sequence 412, rather than the a, b components 416, because the human visual system detects high spatial frequencies mostly on luminance, and not in the opponent color components. Therefore, for the a, b opponent color components 416, the reconstruction to obtain HR a, b images 422 may be simply taking the average of aligned LR images (block 417), where this operation helps reduce noise in the component images, and then interpolating to match the needed HR image resolution using standard interpolation methods, such as bilinear interpolation (block 418). This methodology is much faster than applying the SR method 414 to all three color channels, and it is expected to be perceptually the same, in most cases. A conversion back to RGB color components (block 430) is performed to obtain the result HR color image 432 in the conventional RGB space.

Figure 4:
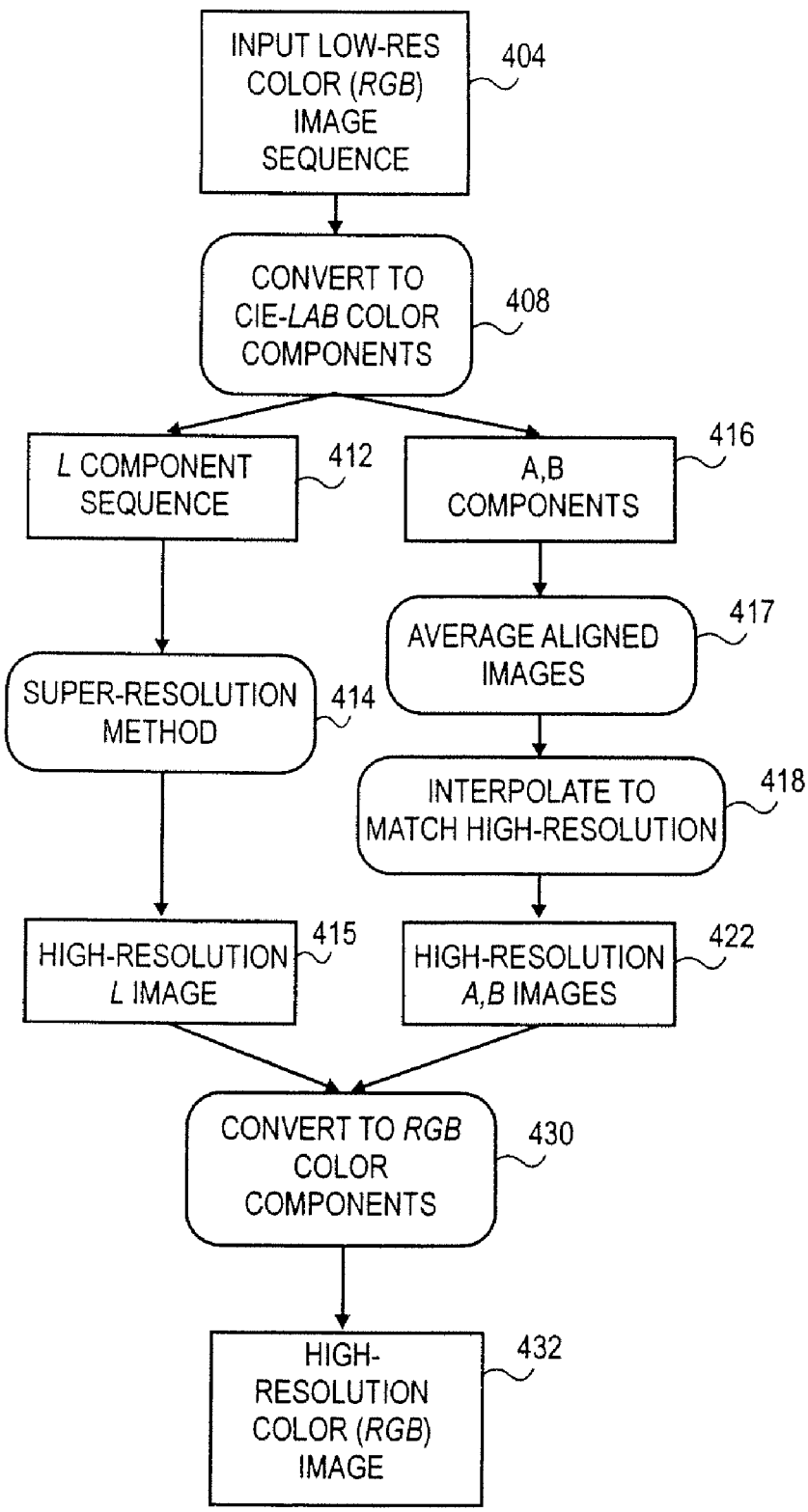
FIG. 4 is a flow diagram of some of the operations in a super resolution image reconstruction method operating on color images.
Figure 5:
FIGS. 5 and 6 shows two images that illustrate the results of applying the super resolution method to webcam images.
Figure 6:

The methodology of FIG. 4 has been implemented and applied to a color image sequence acquired with a relatively inexpensive digital camera of the consumer product variety used in Web interactive applications (also known as a webcam). In that case, the LR color image sequence 404 was recorded while a person held the camera in his hand for about one second (resulting in a sequence of frames being captured). The natural shaking of the user's hand provided the necessary motion for obtaining different sampling grids in the LR images. As can be seen in FIG. 5, the image is a linear interpolation (by a factor of ×3) of the three color channels (to match the higher resolution) from a single LR frame, whereas the image in FIG. 6 is the HR reconstruction obtained by the SR method for color images described above, where in this case a generic Huber function was used for the Likelihoods and Priors. It is evident that the resulting HR image contains much more detail than the interpolated image.

Point Spread Function Calibration

Recall that the point spread function (PSF) models the non-ideality of the camera (also referred to as an image acquisition system). Although a precise knowledge of the PSF of an image acquisition system may not be critical for SR methods to work, the quality of the result HR image may be further improved if such knowledge is incorporated into the SR method. A PSF may be theoretically computed based on the specifications of the image acquisition system. For example, in a video charge coupled device (CCD) camera, the lens and the CCD sensor specification may be used to compute the PSF. However, that information is not always available, in which case the PSF is estimated by calibration.

An existing method to estimate the PSF is to obtain an image that corresponds to a punctual source (e.g., a white point on a black background). Alternatively, the image may correspond to an equivalent punctual source, such as an expanded laser beam. The image thus projected in the image plane (focal plane) of the camera sensor corresponds to the PSF. This optical image is sampled by the sensor, to obtain a digital version. If the sampling frequency is higher than twice the highest frequency of the PSF, then the digital version may be considered a complete representation of the underlying, continuous PSF. However, in the case of super resolution reconstruction, the sampling frequency (for the LR images) is clearly lower than the one needed to avoid aliasing. Therefore, a single, LR image of a punctual source is a noisy and potentially aliased version of the underlying PSF.

According to an embodiment of the invention, a higher resolution, aliasing free version of the PSF is recovered using an LR image sequence of a moving punctual source, instead of a single image. This method may be essentially the same as the ones described above for obtaining an HR image from an LR image sequence, except that in this case the process has the knowledge that the result HR image is that of a punctual source, and also that the PSF is not known. Since there is a linear relation between a punctual source and a PSF, it is possible to interchange the roles of the scene being imaged and the PSF. Thus, to recover the PSF, it may be sufficient to apply the same SR method described above to an image sequence obtained using the punctual source, with the PSF as a point (or, more generally, the known images used as a test for calibrating the PSF). The recovered HR image should be a higher resolution version of the underlying PSF. This resulting, calibrated PSF may then be used in the observation model, for determining the Likelihood function in the SR methods described earlier.

System Applications

The SR methods described above may be used in a variety of different system applications, provided there is enough computational power to produce a solution to the estimation process in a reasonable time. As small and inexpensive digital image acquisition devices are becoming common place, such as consumer grade digital cameras and webcams, the SR methods may be implemented using LR images captured by such devices, to provide enhanced digital images from limited image acquisition hardware capability. Specific examples include resolution improvement in images acquired with solid state digital cameras attached to cellular/mobile telephones, personal digital assistants, and other small electronic devices whose main purpose is not to acquire images. In such applications, a sequence of LR images are captured while the camera is being held by the user, where the natural motion of the user's hand will produce the motion needed to generate the needed LR images. Such portable devices may, however, lack the computational power to execute the operations required by SR methods in a reasonable time. The LR image sequence could instead be transmitted to either a dedicated server that provides computing services (such as a Web based service business model) for this particular application, or to a personal computer in which the HR image or image sequence may be reconstructed.

With respect to webcams, again their primary purpose may not be to take high resolution images. Accordingly, the SR methods will convert this relatively inexpensive, low resolution device into a high resolution camera. For example, the increase in resolution may allow a webcam with a standard video graphics resolution of 640×480 to scan a letter sized document at a resolution of 200 dots per inch, suitable for printing and fax transmission at reasonable quality. This inexpensive and relatively common device may then be used as an occasional document scanner, by simply placing the document to be scanned on the user's desk and aiming the webcam at the document, taking a sequence of images while the user is holding the webcam above the document in her hand. No additional equipment is needed to hold the camera, because the natural shaking of the user's hand provides the motion needed for differences between the LR images so that the super resolution method will work to yield a high resolution image.

In yet another application, resolution improvement may be achieved for conversion of standard video to high definition video. In that case, N frames may be collected from time t to time t+N (in frames), where these frames become the LR images used to generate the high resolution frame corresponding to time t+N. In this case, the resolution improvement may be limited to the part of a scene that is visible during the interval in which the low resolution frames are collected. This resulting HR frame will be a clear perceptual improvement with respect to a simple interpolation of the standard video to high definition video. This embodiment may be used to generate, for example, high definition television, HDTV, video from standard video sequences, or to generate HR images that are suitable for high definition printing from standard (lower resolution) video sequences.

The SR methods may also be applied to obtain image enhancement, including de-noising, de-blurring, and resolution improvement, in images that have been acquired with scanning imaging devices (e.g., scanning electron microscope, focused ion beam, and laser voltage probe). To obtain the different LR images needed for the SR method, these scanning imaging devices allow the scanning pattern to be varied, thus producing different sampling grids with subpixel shifts needed for the SR method. Such devices may be part of tools used in microelectronic test and manufacturing, to image and/or repair semiconductor structures and lithography masks. In some cases, such tools need to be operated at a lower resolution than the maximum possible, to increase throughput or because the parameters of the tool are optimized for nano-machining rather than optimal imaging. With such images, specific Prior models may be available that can be adapted to render the SR methods more effective.

Figure 7:
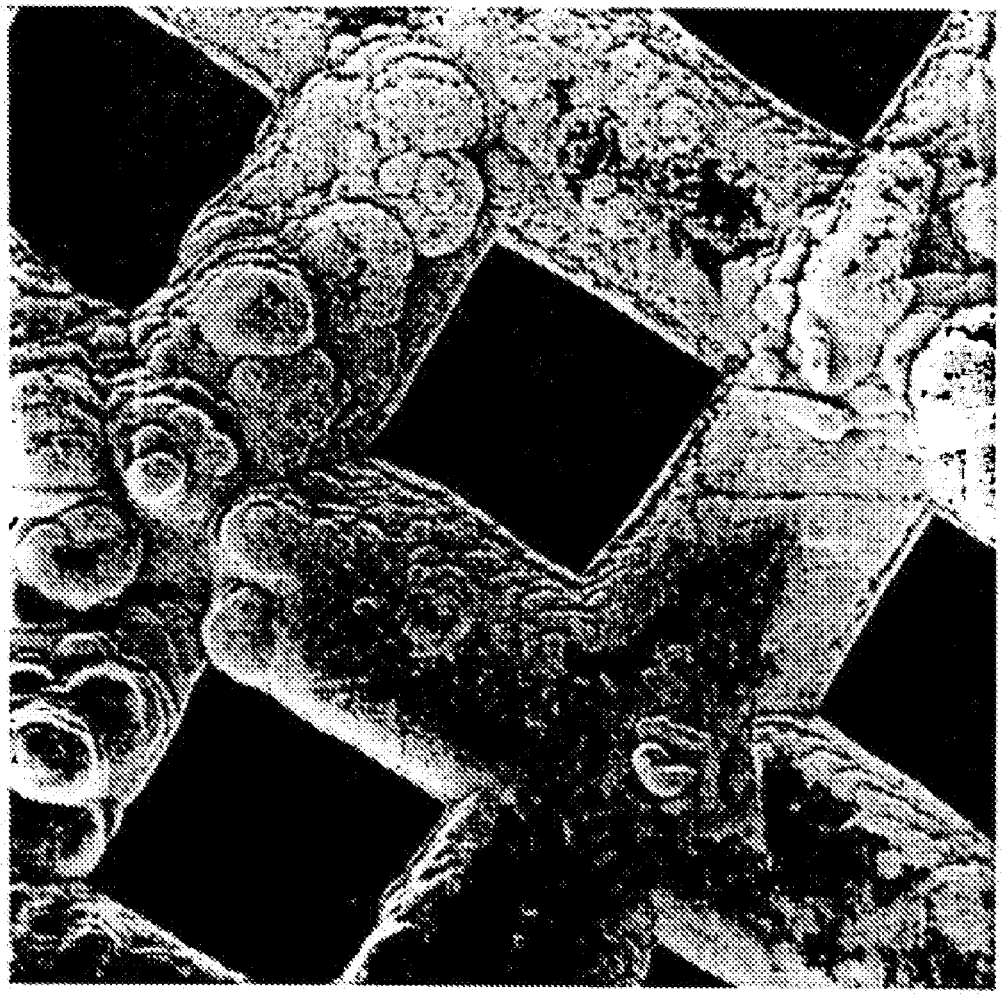
FIGS. 7-11 shows images that illustrate the results of applying the super resolution method to images from a scanning beam nano-imaging device.
Figure 8:
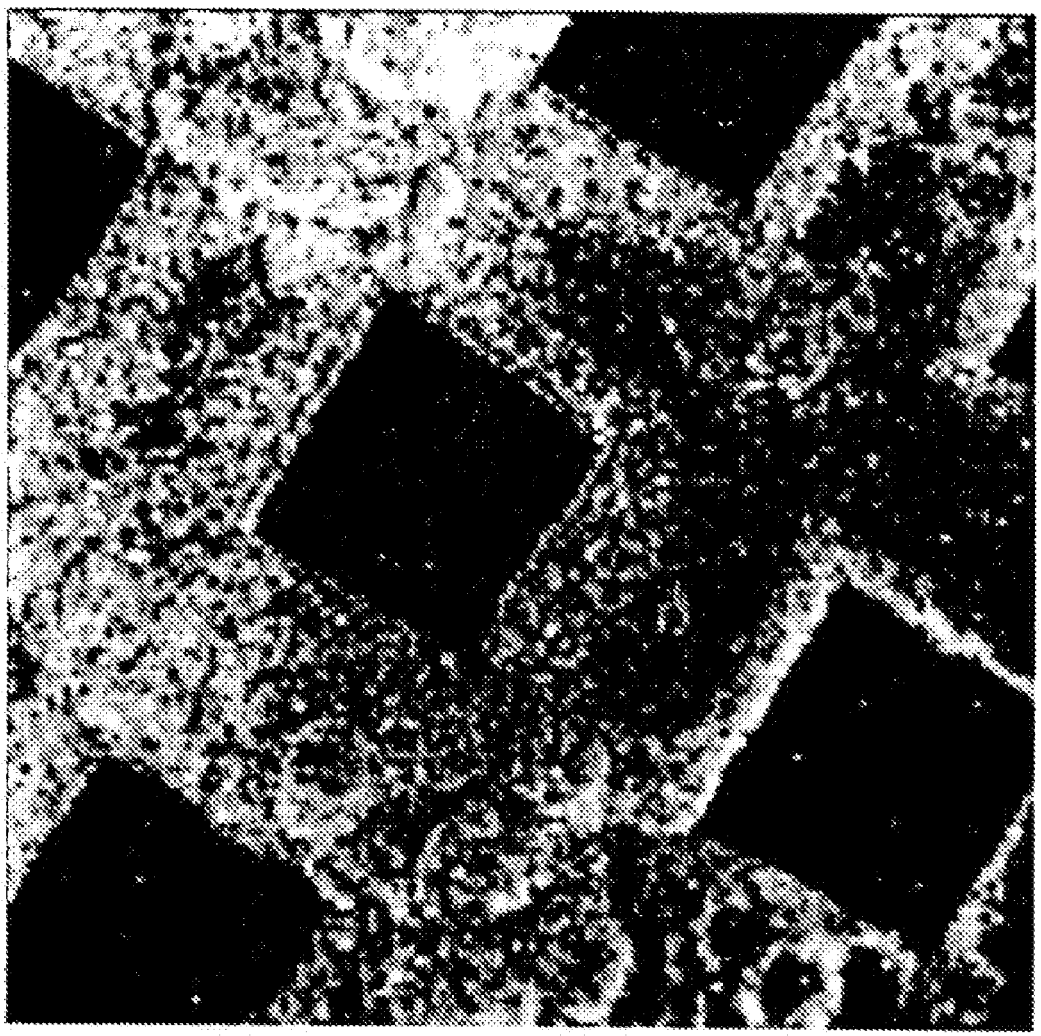
Figure 9:
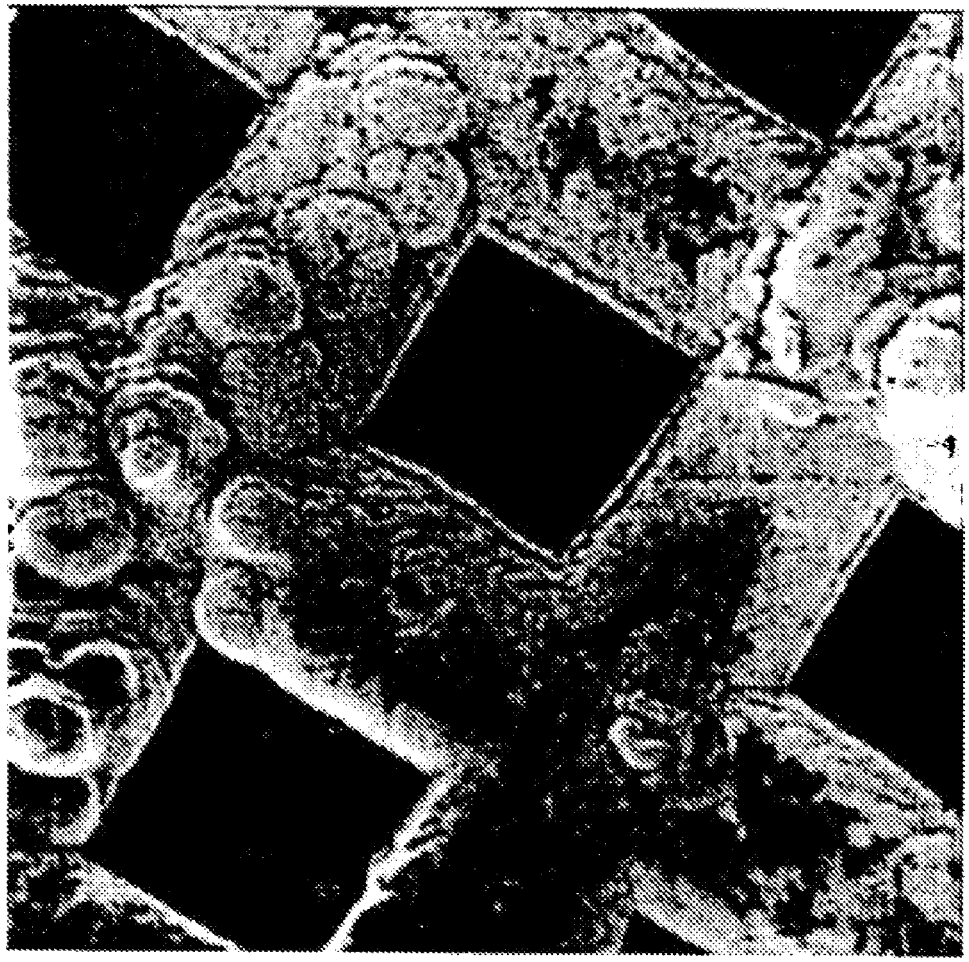
Figure 10:
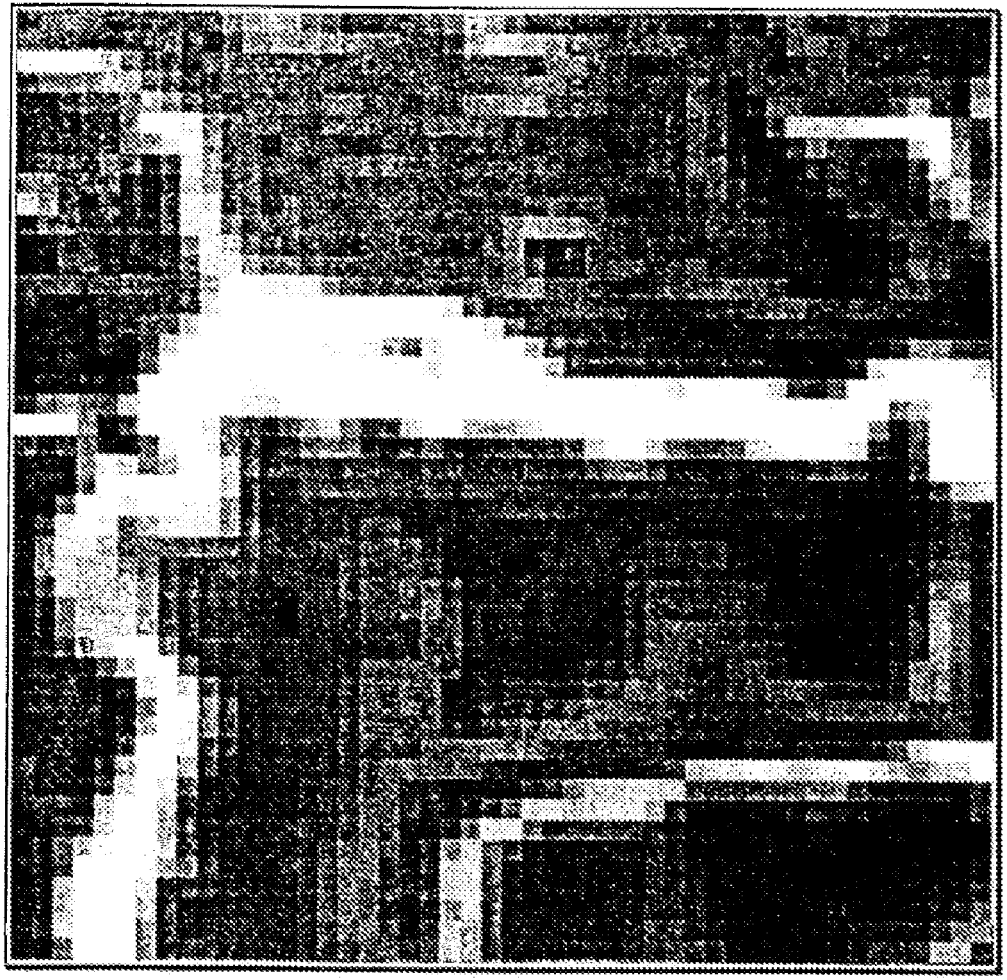
Figure 11:
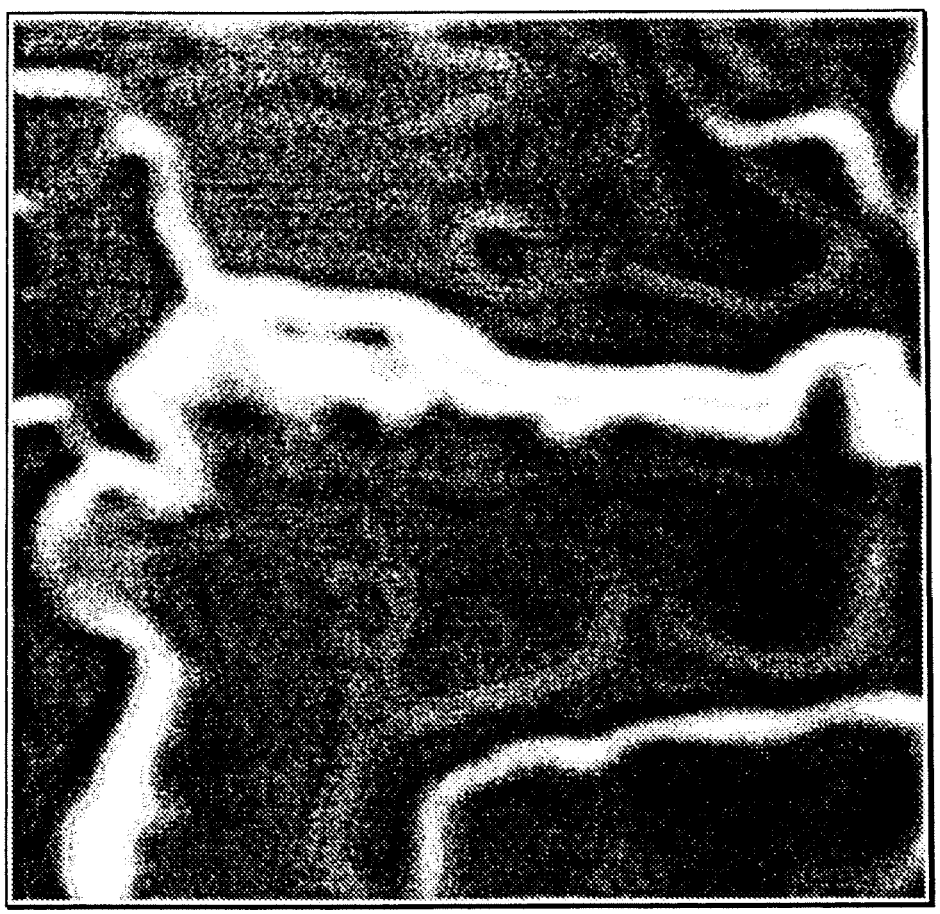

Also, as microelectronic manufacturing advances, the features of the structures being inspected are becoming smaller and smaller, such that lower quality images may be produced in the future when using current scanning imaging devices. By enhancing images from older generation scanning imaging devices, the life span of such tools will be extended in the future, without having to upgrade or replace the tools, thereby translating into significant savings in tooling costs. FIGS. 7-9 and 10-11 show two examples, respectively of applying the SR method to reconstruct a high resolution scanning imaging device image. In the first example (FIGS. 7-9), a high resolution focused ion beam image is to be reconstructed, from a simulated noisy low resolution milling sequence. In FIG. 7, an original HR image acquired with a focused ion beam tool is shown. In FIG. 8, one LR image out of a sequence of 4× subsampled images after low pass filtering, with additive noise is shown. FIG. 9 shows the SR reconstruction. Note the clear improvement in detail between the SR reconstruction (FIG. 9) and the LR image (FIG. 8). The improvement in detail is also apparent in the second example, corresponding to a real milling sequence with displaced millboxes. Compare one of the initial LR images (FIG. 10), magnified ×8 using nearest neighbor interpolation, and the result HR image after applying SR reconstruction, magnified ×8 (FIG. 11).

The SR methods described above may be implemented using a programmed computer. A computer program product or software may include a machine or computer-readable medium having stored thereon instructions which may be used to program a computer (or other electronic devices) to perform a process according to an embodiment of the invention. In other embodiments, operations might be performed by specific hardware components that contain microcode, hardwired logic, or by any combination of programmed computer components and custom hardware components.

A machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, a transmission over the Internet, electrical, optical, acoustical or other forms of propagated signals (e.g., carrier waves, infrared signals, digital signals, etc.) or the like.

The invention is not limited to the specific embodiments described above. For example, the noise n in the observation model of Equation (1), which is modeled as a non-Gaussian robust function, may alternatively be any noise distribution previously learned from pairs of HR images and LR image sequences. Accordingly, other embodiments are within the scope of the claims.

What is claimed is:

1. A method for image processing, comprising:
computing a result higher resolution (HR) image of a scene given a plurality of observed lower resolution (LR) images of the scene using a Bayesian estimation image reconstruction methodology,
wherein the methodology yields the result HR image based on a Likelihood probability function that implements a model for the formation of LR images in the presence of noise,
and wherein the methodology models the noise by a probabilistic, non-Gaussian, robust function.

2. The method of claim 1 wherein the methodology yields the result HR image based on maximizing posteriori probability, that is the conditional probability of an unknown HR image given the observed LR images,
wherein the methodology yields the result HR image based on combining the Likelihood function with a Prior probability function,
the Prior function indicating which HR images are probable.

3. The method of claim 2 wherein the modeling of the noise by the robust function causes the role of a statistical outlier pixel in an observed LR image to be downplayed when computing a trial HR image based on the Likelihood function, so that a computed Likelihood probability for said observed LR image is higher than if the noise were modeled by a Gaussian function.

4. The method of claim 3 wherein:
the robust function is a Huber function.

5. The method of claim 3 wherein:
the robust function is a Tukey function.

6. The method of claim 2 wherein the Prior function used in the methodology implements one of a Gaussian Markov Random Field (MRF), a Huber MRF, and Tukey MRF to indicate the probability of which pixels in an image take on which values.

7. The method of claim 3 further comprising:
setting the robust function to a different function depending on whether the observed LR images have relatively few and relatively many outliers,
wherein the methodology estimates a shape of the robust function according to the availability of training data.

8. The method of claim 3 wherein the methodology estimates a shape of the robust function by selecting a scale factor,
wherein if there is sufficient training data in the form of one or more ground truth HR images and their corresponding LR images, the scale factor is estimated from samples obtained in computing an error between the observed LR images of the scene and their projections from the ground truth HR images.

9. The method of claim 8 wherein if there is insufficient training data, the scale factor is estimated by (1) taking a current, trial HR image of an iterative, maximum a posteriori estimation process as a ground truth HR image, and (2) a robust estimator for the scale factor.

10. The method of claim 3 further comprising defining the Prior function based upon computer aided design models for structures captured in the observed LR images.

11. The method of claim 3 wherein the Prior function is based on a non-Gaussian, robust Markov Random Field.

12. A system comprising:
a processor; and
memory having instructions that, when executed by the processor, generate a result higher resolution (HR) image of a scene based on a plurality of lower resolution (LR) images of the scene, using a Bayesian image reconstruction methodology based on a Likelihood probability function that implements a model for LR image formation that includes additive noise, and wherein the methodology models the additive noise by a probabilistic, non-Gaussian, robust function.

13. The system of claim 12 wherein the processor and memory are part of one of a desktop and notebook personal computer,
and wherein the memory stores further instructions that when executed by the processor obtain the plurality of LR images based on images downloaded into the personal computer from a digital camera.

14. The system of claim 13 wherein the instructions are to obtain the plurality of LR images as video, based on video downloaded into the personal computer from the digital camera, and wherein a plurality of result HR images are to be generated as HR video of the scene.

15. The system of claim 14 wherein the instructions are to generate the HR video in a high definition television, HDTV, format.

16. The system of claim 12 wherein the instructions are to yield the result HR image based on maximizing posteriori probability which is a combination of the Likelihood function and a Prior probability function, the Prior function indicating which HR images are probable.

17. An article of manufacture comprising:
a machine accessible medium containing instructions that, when executed, cause a machine to compute a result higher resolution (HR) image of a scene given a plurality of observed lower resolution (LR) images of the scene using a Bayesian image reconstruction methodology, wherein the methodology yields the result HR image based on a Likelihood probability function that implements a model for LR image formation in the presence of noise,
and wherein the methodology models the noise by a weighting function that causes the role of a statistical outlier pixel in an observed LR image to be downplayed when computing a trial HR image based on the Likelihood function, so that a computed Likelihood probability for said observed LR image given the trial HR image is higher than if the noise were modeled by a Gaussian function.

18. The article of manufacture of claim 17 wherein the instructions are such that the methodology yields the result HR image based on maximizing posteriori probability, that is the conditional probability of an unknown HR image given observations about LR images,
wherein the methodology yields the result HR image based on combining the Likelihood function with a Prior probability function,
the Prior function indicating which HR images are probable.

19. The article of manufacture of claim 18 wherein the medium includes further instructions that set the weighting function to a different function depending on whether the plurality of observed LR images have relatively few and relatively many outliers,
and wherein the methodology estimates a shape of the weighting function according to the availability of training data.

20. The article of manufacture of claim 18 wherein the instructions are such that the methodology estimates a shape of the weighting function by selecting a scale factor,
wherein if there is sufficient training data in the form of one or more ground truth HR images and their corresponding LR images, the scale factor is estimated from samples obtained in computing an error between the plurality of observed LR images of the scene and their projections from the ground truth HR images.

21. The article of manufacture of claim 20 wherein the instructions are such that if there is insufficient training data, the scale factor is estimated by (1) taking a current, trial HR image of an iterative, maximum a posteriori estimation process as a ground truth HR image, and (2) a robust estimator for the scale factor.

* * * * *